(12) United States Patent
Jia et al.

(10) Patent No.: US 11,409,374 B2
(45) Date of Patent: Aug. 9, 2022

(54) METHOD AND DEVICE FOR INPUT PREDICTION

(71) Applicant: Beijing Kingsoft Internet Security Software Co., Ltd., Beijing (CN)

(72) Inventors: Yawei Jia, Beijing (CN); Xiaoqiang Wu, Beijing (CN)

(73) Assignee: Beijing Kingsoft Internet Security Software Co., Ltd., Beijing (CN)

( * ) Notice: Subject to any disclaimer, the term of this patent is extended or adjusted under 35 U.S.C. 154(b) by 0 days.

(21) Appl. No.: 16/761,216

(22) PCT Filed: Jun. 18, 2019

(86) PCT No.: PCT/CN2019/091755
§ 371 (c)(1),
(2) Date: May 1, 2020

(87) PCT Pub. No.: WO2020/001329
PCT Pub. Date: Jan. 2, 2020

(65) Prior Publication Data
US 2021/0405765 A1    Dec. 30, 2021

(30) Foreign Application Priority Data
Jun. 28, 2018   (CN) .......................... 201810691065.3

(51) Int. Cl.
*G06F 3/023*   (2006.01)
*G06F 40/268*  (2020.01)
(Continued)

(52) U.S. Cl.
CPC .......... *G06F 3/0237* (2013.01); *G06F 40/242* (2020.01); *G06F 40/268* (2020.01);
(Continued)

(58) Field of Classification Search
CPC .... G06F 3/0237; G06F 40/242; G06F 40/268; G06F 40/274; G06F 3/04886;
(Continued)

(56) References Cited

U.S. PATENT DOCUMENTS 10,380,236 B1 *   8/2019   Ganu .................... G06F 40/289
2008/0126092 A1 * 5/2008   Kawazoe ........... H04N 21/4394
                                                       704/E15.04
(Continued)

FOREIGN PATENT DOCUMENTS

CN      104331437 A    2/2015
CN      107578106 A    1/2018
(Continued)

OTHER PUBLICATIONS

International Search Report dated Sep. 24, 2019, issued in connection with International Application No. PCT/CN2019/091755, filed on Jun. 18, 2019, 4 pages.
(Continued)

*Primary Examiner* — Quoc A Tran
(74) *Attorney, Agent, or Firm* — McDonnell Boehnen Hulbert & Berghoff LLP

(57) ABSTRACT

A method and apparatus for input prediction. The method includes: obtaining an input current text; obtaining a first state parameter of a first text from a cache; inputting the current text and the first state parameter into the recurrent neural network, determining a state parameter of the current text through the recurrent neural network according to the first state parameter; and determining a predicted text of the current text from the word library according to the state parameter of the current text. The first text is a previous text of the current text; the first state parameter is determined through a preset recurrent neural network according to the first text and a state parameter of a previous text of the first
(Continued)

text; the recurrent neural network is trained with a preset word library; the word library is used to store words. Through the method and apparatus, time for determining a predicted text is reduced.

14 Claims, 5 Drawing Sheets

(51) Int. Cl.
| | | |
|---|---|---|
| G06F 40/242 | (2020.01) | |
| G06F 40/274 | (2020.01) | |
| G06N 3/08 | (2006.01) | |
| G06F 40/216 | (2020.01) | |
| G06F 40/284 | (2020.01) | |
| G06F 3/04886 | (2022.01) | |
| G06N 3/04 | (2006.01) | |
| G06F 17/00 | (2019.01) | |

(52) U.S. Cl.
CPC ............ *G06F 40/274* (2020.01); *G06N 3/08* (2013.01); *G06F 3/0233* (2013.01); *G06F 3/04886* (2013.01); *G06F 40/216* (2020.01); *G06F 40/284* (2020.01); *G06N 3/0454* (2013.01)

(58) Field of Classification Search
CPC .... G06F 3/0233; G06F 40/216; G06F 40/284; G06N 3/08; G06N 3/0454
See application file for complete search history.

(56) References Cited

U.S. PATENT DOCUMENTS

| | | | |
|---|---|---|---|
| 2017/0192956 A1* | 7/2017 | Kaiser | G10L 25/30 |
| 2018/0046614 A1* | 2/2018 | Ushio | G06F 40/35 |
| 2018/0096677 A1* | 4/2018 | Pollet | G06F 16/24 |
| 2018/0174576 A1* | 6/2018 | Soltau | G10L 21/10 |
| 2019/0340236 A1* | 11/2019 | Le | G06F 40/284 |
| 2020/0022577 A1 | 1/2020 | Rishoni et al. | |

FOREIGN PATENT DOCUMENTS

| | | |
|---|---|---|
| CN | 107621891 A | 1/2018 |
| CN | 107705784 A | 2/2018 |
| CN | 107850939 A | 3/2018 |
| CN | 108062388 A | 5/2018 |
| CN | 109002186 A | 12/2018 |
| KR | 2017-0081887 A | 7/2017 |
| WO | 2017/160393 A1 | 9/2017 |

OTHER PUBLICATIONS

Written Opinion dated Sep. 23, 2019, issued in connection with International Application No. PCT/CN2019/091755, filed on Jun. 18, 2019, 4 pages.

* cited by examiner

METHOD AND DEVICE FOR INPUT PREDICTION

CROSS-REFERENCE TO RELATED APPLICATIONS

The present application is a U.S. National Phase Application under 35 U.S.C. § 371 of International Application No. PCT/CN2019/091755 filed Jun. 18, 2019, which claims priority to Chinese patent application No. 201810691065.3 filed with the China National Intellectual Property Administration on Jun. 28, 2018 and entitled "Method and Device for Input Prediction", the disclosures of each of which are incorporated herein by reference in their entirety.

TECHNICAL FIELD

The present application relates to the technical field of input methods, and in particular, to a method and apparatus for input prediction.

BACKGROUND

For improved ease of input, an input method client is typically capable of word prediction, that is, predicting, based on currently input text, a subsequent text that a user is probably to input. The text as predicted is referred to as a predicted text. After the input method client determines a predicted text, it presents the predicted text to the user to be selected and entered. The input method client is an input application program.

The input method client may predict a text by means of a recurrent neural network based on currently input text. Specifically, through the recurrent neural network, subsequent text of the currently input text may be predicted according to previous texts of the currently entered text.

Although this input prediction scheme can provided predicted texts that are somewhat accurate, calculation on previous texts through recurrent neural network is required in the determination of predicted text. The predicted texts of the currently input text are determined based on the calculation result. This increases the time required by determination of predicted text. Therefore, an urgent problem is how to reduce the time required to determine the predicted text to minimum.

SUMMARY

Embodiments of the present application provide a method and apparatus for input prediction, to reduce the time required for determining the prediction text. The specific technical solutions are as follows.

In a first aspect, an embodiment of the present application provides a method for input prediction. The method may include:

obtaining an input current text;

obtaining a first state parameter of a first text from a cache, wherein the first text is a previous text of the current text; the first state parameter is determined through a preset recurrent neural network according to the first text and a state parameter of a previous text of the first text; the recurrent neural network is trained with a preset word library; the word library is used to store words;

inputting the current text and the first state parameter into the recurrent neural network, and determining a state parameter of the current text through the recurrent neural network according to the first state parameter; and determining a predicted text of the current text from the word library according to the state parameter of the current text.

Optionally, after determining a state parameter of the current text, the method further includes:

storing the state parameter of the current text in the cache.

Optionally, determining a predicted text of the current text from the word library according to the state parameter of the current text includes:

determining word scores for words in the word library according to the state parameter of the current text;

selecting target words from the words in the word library according to the word scores; and determining a predicted text of the current text according to the target words.

Optionally, determining a predicted text of the current text according to the target words includes:

matching the current text with morphemes in a preset dictionary library respectively, and taking morphemes in the dictionary library that match the current text as candidate morphemes that are similar to the current text, wherein, the dictionary library is used to store morphemes;

obtaining word scores for words in the word library determined in the input prediction of the first text;

determining scores for the candidate morphemes from the word scores for words in the word library determined in the input prediction of the first text; and selecting the predicted text of the current text from the target words and candidate morphemes according to word scores for the target words and the scores for the candidate morphemes.

Optionally, determining a state parameter of the current text through a recurrent neural network according to the first state parameter includes:

determining the state parameter of the current text according to network parameters for the operation of the recurrent neural network and the first state parameter;

wherein, the network parameters for the operation of the recurrent neural network are obtained in the following manner:

obtaining network parameters when training of the recurrent neural network is completed; and performing integer approximation on fractional parameters in the network parameters when the training is completed, and taking network parameters subjected to the integer approximation as the network parameters for the operation of the recurrent neural network.

Optionally, the method is applied to a client, and an installation file of the client is obtained by the following operations:

obtaining an initial installation file generated according to original codes of the client, and obtaining an operation function in the original codes of the client; and removing, from the initial installation file, operation functions other than the operation function in the original codes to obtain the installation file of the client.

In a second aspect, an embodiment of the present application provides an apparatus for input prediction, including:

a text obtaining module configured for obtaining an input current text;

a parameter obtaining module configured for obtaining a first state parameter of a first text from a cache, wherein the first text is a previous text of the current text; the first state parameter is determined through a preset recurrent neural network according to the first text and a state parameter of a previous text of the first text; the recurrent neural network is trained with a preset word library; the word library is used to store words;

a parameter determining module configured for inputting the current text and the first state parameter into the recurrent neural network, and determining a state parameter of the current text through the recurrent neural network according to the first state parameter; and a text predicting module configured for determining a predicted text of the current text from the word library according to the state parameter of the current text.

Optionally, the apparatus further includes:

a parameter caching module, configured for storing the state parameter of the current text in the cache after determining the state parameter of the current text.

Optionally, the text predicting module comprises:

a first determining sub-module configured for determining word scores for words in the word library according to the state parameter of the current text;

a selecting sub-module configured for selecting target words from the words in the word library according to the word scores; and a second determining sub-module, configured for determining a predicted text of the current text according to the target words.

Optionally, the second determining sub-module is specifically configured for:

matching the current text with morphemes in a preset dictionary library respectively, and taking morphemes in the dictionary library that match the current text as candidate morphemes that are similar to the current text, wherein, the dictionary library is used to store morphemes;

obtaining word scores for words in the word library determined in the input prediction of the first text;

determining scores for the candidate morphemes from the word scores for words in the word library determined in the input prediction of the first text; and selecting the predicted text of the current text from the target words and candidate morphemes according to word scores for the target words and the scores for the candidate morphemes.

Optionally, determining a state parameter of the current text through a recurrent neural network according to the first state parameter comprises:

determining the state parameter of the current text according to network parameters for the operation of the recurrent neural network and the first state parameter;

wherein, the network parameters for the operation of the recurrent neural network are obtained in the following manner:

obtaining network parameters when training of the recurrent neural network is completed; and performing integer approximation on fractional parameters in the network parameters when the training is completed, and taking network parameters subjected to the integer approximation as the network parameters for the operation of the recurrent neural network.

Optionally, the apparatus is applied to a client, and an installation file of the client is obtained by the following operations:

obtaining an initial installation file generated according to original codes of the client, and obtaining an operation function in the original codes of the client; and removing, from the initial installation file, operation functions other than the operation function in the original codes to obtain the installation file of the client.

In a third aspect, an embodiment of the present application provides an electronic device, including a processor, a communication interface, a memory, and a communication bus, wherein the processor, the communication interface, and the memory communicate with each other through the communication bus;

the memory is configured to store a computer program; and the processor is configured for executing the computer program stored in the memory to perform the input prediction method described in the first aspect.

In a fourth aspect, an embodiment of the present application provides a computer-readable storage medium having a computer program stored thereon which, when executed by a processor, performs the input prediction method described in the first aspect.

In a fifth aspect, an embodiment of the present application provides an application program which, when executed, performs the input prediction method described in the first aspect.

In the method and apparatus for input prediction provided by the embodiments of the present application, a state parameter of a first text can be obtained from the cache, a current text and a state parameter of the first text are input into a recurrent neural network. The recurrent neural network determines a state parameter of the current text according to the state parameter of the first text and determines a predicted text of the current text from a word library based on the state parameter of the current text. When determining the predicted text of the current text, the recurrent neural network does not need to determine the state parameter of the first text according to the state parameter of the previous text of the first text, but obtains the state parameter of the first text directly from the cache. Time consumed for determining the predicted text can thus be reduced and user experience is enhanced. Of course, the implementation of any product or method of this application does not necessarily achieve all the advantages described above at the same time.

BRIEF DESCRIPTION OF THE DRAWINGS

In order to describe the technical solutions in the embodiments of the present application or the prior art more clearly, the drawings used in the description of the embodiments or the prior art will be briefly introduced below. It is apparent that the drawings in the following description are only some embodiments of the present application. For those of ordinary skill in the art, other drawings can be obtained based on these drawings without any creative effort.

DETAILED DESCRIPTION

The technical solutions of the embodiments of the present application will be described clearly and completely in combination of the accompanying drawings of the embodiments of the present application. It is apparent that the described embodiments are only a part of the embodiments of the present application, but not all of them. All other embodiments obtained by a person of ordinary skill in the art based on the embodiments of the present application without any creative effort fall within the protection scope of the present application.

In order to reduce the time required for determining a predicted text, an embodiment of the present application provides a method and apparatus for input prediction. The following describes this application in detail through specific embodiments.

Figure 1:
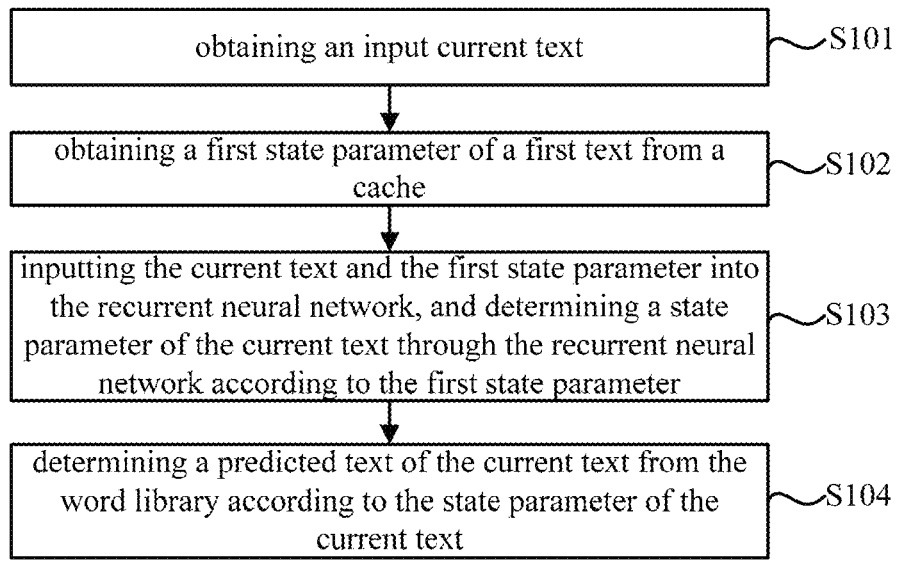
FIG. 1 is a schematic flowchart of a method for input prediction according to an embodiment of the present application.

FIG. 1 is a schematic flowchart of a method for input prediction provided by an embodiment of the present application. The method can be applied to an electronic device, and can be specifically applied to a client in an electronic device. The client may be an input method application installed in an electronic device. The electronic device may be a computer, a server, a mobile device, or the like. The mobile device can be a smart phone, a tablet, or the like. The method includes the following operations.

Step S101: obtaining an input current text.

The current text may be input by a user. Upon receiving the current text input by the user, for ease of user's input, the client may predict subsequent texts the user is to input, i.e., determine predicted texts for the current text, and present it to the user. The user may then select from the predicted texts. As such, time for text input is saved and user has better input experience.

The client may obtain the current text when a prediction condition is met i.e., when input prediction is triggered. The prediction condition may be that, when a suspension after use input of current text exceeds a preset duration threshold; or a prediction button is triggered after the user input of the current text.

The current text may be in different forms depending on languages. For example, in English, the current text can be a word or a part of a word, for example, posted, p, or po. In Chinese, the current text can be a single character or strokes of a character.

Step S102: obtaining a first state parameter of a first text from a cache.

The first text is a previous text of the current text. The first state parameter is determined through a preset recurrent neural network according to a state parameter of the previous text of the first text and the first text. The recurrent neural network is trained with a preset word library. The word library is used to store words.

The recurrent neural network can be a Long Short Term Memory (LSTM) network. The LSTM can solve the prediction problem of time series.

Words in the word library may be obtained from a collected corpus. The word library may contain a large amount of words, for example, 20,000 words. The word library may also exist in the form of a word table, with words arranged in a predetermined order, for example, in alphabetical order or in letter-count order. Words in the word library would vary depending on languages. In English, each word in the word library can be a word or a phrase. In Chinese, each word in the word library can be a single character, or a word or phrase composed of two or more characters. For ease of description, in the embodiments of the present application, the input prediction method is described in the context of English as an example.

Step S103: inputting the current text and the first state parameter into the recurrent neural network, and determining a state parameter of the current text through the recurrent neural network according to the first state parameter.

The state parameter can be understood as the internal memory or internal knowledge of the neural network. The state parameter refers to the state parameter of the hidden layer in the recurrent neural network. Different current texts have different corresponding state parameters. The state parameter may be a vector of a preset dimension, for example, a 100-dimensional vector.

For the very first text, there is no previous text. In this case, a preset state parameter may be used as the first state parameter, and the method directly starts with step S103.

After determining the state parameter of the current text, it can be stored in a cache. In this way, in the prediction with respect to the next text, the state parameter of the previous text can be obtained directly from the cache.

When the current text is input into the recurrent neural network, the current text can be mapped to a vector, and the current text is input, as a vector, to the recurrent neural network.

Step S104: determining a predicted text of the current text from the word library according to the state parameter of the current text.

The recurrent neural network is trained with the word library. The state parameter of the current text can reflect association between the current text and words in the word library. Therefore, after obtaining the state parameter of the current text, it can be determined from the word library which words can be used as predicted texts for the current text according to the state parameter of the current text. In addition, because reference is made to the state parameter of the previous text in the determination of the state parameter of the current text, the meaning of an entire sentence is considered in the determination. Therefore, predicted texts determined based on the state parameter of the current text are more accurate.

It can be known from the above that, in this embodiment, a state parameter of a first text can be obtained from the cache. The current text and the state parameter of the first text are input into a recurrent neural network. The recurrent neural network determines a state parameter of the current text according to the state parameter of the first text and determines a predicted text of the current text from a word library based on the state parameter of the current text. When determining the predicted text of the current text, the recurrent neural network does not need to determine the state parameter of the first text according to the state parameter of the previous text of the first text, but obtains the state parameter of the first text directly from the cache. Time required for determining the predicted text can thus be reduced and user experience is enhanced.

In a solution where a statistical language model is used to determine the predicted texts, the prediction depends only on one or two previous words in the context. It is difficult to predict, in this way, the content a user really wants to input. The statistical language model can be unigram, bigram, or trigram model. In this embodiment, however, a recurrent neural network is used for input text prediction. For each prediction, the state parameter of the previous word is utilized. As such, information of all texts previous to the current text is taken into consideration, thus the determined predicted text is also more accurate.

A mobile device's processing power and storage space are typically limited. Further, a user is very sensitive to delay in the prediction during his text input on a mobile device, and a delay of more than 200 ms will be readily perceived by the user. In this embodiment, the state parameter of a previous text is cached and can be directly obtained from the cache when needed. The delay in prediction is thus reduced, thereby allowing the application of recurrent neural network to a mobile device for local prediction.

In another embodiment of the present application, based on the embodiment shown in FIG. 1, step S104 of determining a predicted text of the current text from the word library according to the state parameter of the current text includes the following steps 1a to 3a.

Step 1a: determining word scores for words in the word library according to the state parameter of the current text.

The word score can be understood as the probability that a word would be input after the current text.

Word scores for words in the word library can be determined through the following manner.

A scoring vector representing correspondence between the state parameter of the current text and all the words in the word library is obtained by a transformation matrix. Each element in the scoring vector is associated with one word in the word library. The elements in the scoring vector are word scores for associated words.

The transformation matrix may be a preset matrix. For example, the state parameter of the current text is a matrix of 1×100, and the transformation matrix is a matrix of 100×20,000, where 20,000 is the total number of words in the word library. After multiplying the state parameter of the current text with the transformation matrix, a 20,000-dimensional scoring vector is obtained. Each element in the scoring vector is the word score of the corresponding word.

In order to facilitate subsequent processing, word scores may be normalized. Specifically, after multiplying the state parameter of the current text with the transformation matrix to obtain a scoring vector, elements in the scoring vector are normalized to be word scores.

In another embodiment, after determining word scores for words in the word library for the current text, that is, after determining word scores for words in the word library during input prediction with respect to the current text, the word scores for words in the library are saved in a cache. In this way, in input prediction for further subsequent texts, words scores can be directly obtained from the cache.

Step 2a: selecting target words from the words in the word library according to the word scores.

A preset number of words with the highest word scores in the word library may be selected as target words. For example, the preset number is 5. In this case, word scores can be sorted in a descending sequence or an ascending sequence, and 5 words in the word library having the highest word scores in the sequence are determined as target words.

Alternatively, words in the word library that have scores greater than a first scoring threshold are selected as the target words. For example, if the first scoring threshold is 75, words with scores greater than 75 can be selected as the target words.

Step 3a: determining a predicted text of the current text according to the target words.

Specifically, target words can be directly determined as a predicted text of the current text. The predicted text of the current text can also be obtained after performing preset processing on the target words.

In summary, in this embodiment, scores for words in the word library can be obtained according to the state parameter of the current text, and target words are selected from the word library according to the word scores. This provides a specific implementation for obtaining a predicted text based on the state parameter.

In another embodiment of the present application, the current text may be a complete morpheme or a non-complete morpheme. For example, in English, the current text can be a word or a part of a word, i.e., a single letter or a combination of several letters. The present application further provides the following embodiments in which a predicted text as determined can be used to complete incomplete morphemes and correct errors input by a user.

In this embodiment, the foregoing step 3a of determining a predicted text of the current text according to the target words can include the following steps 3a-1 to 3a-4.

Step 3a-1: matching the current text with morphemes in a preset dictionary library, and taking morphemes in the dictionary library that match the current text as candidate morphemes that are similar to the current text.

The dictionary library stores complete morphemes. A morpheme in the dictionary library can be understood as the smallest unit of meaning in the language of the dictionary library. For example, in English, each morpheme in the dictionary library is a single word; and in Chinese, each morpheme in the dictionary library is a single character.

The operation of matching the current text with morphemes in the dictionary library may include: taking morphemes starting with the current text as matched morphemes; and/or, calculating similarities between the current text and morphemes in the dictionary library, and taking morphemes having a similarity greater than a similarity threshold as matched morphemes. The above matching process can obtain words that can complete the current text and words capable of correcting typing errors.

For example, when the current text is "p", candidate morphemes can include posted, post, person, photo and the like. A current text of "goud" may be a typo error by the user. In this case, based on the similarity calculation, candidate morphemes including "good" and "goad" can be obtained. When the current text is several strokes, a candidate morpheme may be a character including these several strokes.

A preset string similarity algorithm can be used to calculate the similarity between the current text and a morpheme. The string similarity algorithm can be Levenshtein Distance algorithm or Euclidean distance algorithm.

Step 3a-2: obtaining word scores for words in the word library determined in the input prediction of the first text.

Specifically, word scores for words in the word library determined in the input prediction of the first text may be directly obtained from the cache.

Step 3a-3: determining scores for the candidate morphemes from the word scores for words in the word library determined in the input prediction for the first text.

This operation may specifically include, taking the word scores for words in the word library determined in the input prediction of the first text as reference word scores; matching each of candidate morphemes with words in the word library, and determining the reference word score corresponding to a matched word in the word library as a score of the candidate morpheme.

For example, the word library includes words of am, like, post, and book. In the input prediction of a first text I, word scores for the above words in the library were determined to be: am-0.94, like-0.52, post-0.32, and book-0.01. Therefore, when "am" is taken as a candidate morpheme, its score is determined to be 0.94. When "book" is taken as a candidate morpheme, its score is determined to be 0.01.

The first text is the previous text of the current text. The score of each candidate morpheme is determined based on the word scores that were determined in the input prediction of the first text. In this way, influence of the previous text on the current text is considered, so the scores for the determined candidate morphemes are more reasonable.

When there is no previous text of the current text, the scores of candidate morphemes may be determined from scores of words in the preset word library.

Step 3a-4: selecting the predicted text of the current text from the target words and candidate morphemes according to word scores for the target words and the scores for the candidate morphemes.

In selection of predicted texts of the current text, target words and candidate morphemes can be taken as to-be-selected targets, and a preset number of to-be-selected targets with the highest scores can be selected from all the targets as predicted texts of the current text. Alternatively, a to-be-selected target with a score greater than a preset second score threshold may be selected from all the targets as a predicted text of the current text.

A target word is a word determined through a recurrent neural network, and a candidate morpheme is a word obtained by completing and correcting the current text. According to the word scores for the target words and the scores for candidate morphemes, the predicted text of the current text is selected from the target words and the candidate morphemes. Prediction, completion and error correction for the current text can be considered at the same time.

In summary, this embodiment can determine, in combination with a dictionary library, candidate morphemes that are close to the current text. The candidate morphemes may be used to complement or correct the current text, and a predicted text of the current text can be determined according to candidate morphemes and target words. In addition to prediction, completion and error correction can be implemented. Therefore, the determined predicted text is more accurate and reasonable.

The processing capacity and storage space of a mobile device are limited. Thus, in order to compress the size of the client and reduce the space occupation, the following embodiment is further provided in this application.

In this embodiment, determining a state parameter of the current text through a recurrent neural network according to the first state parameter may include:

determining the state parameter of the current text according to network parameters for the operation of the recurrent neural network and the first state parameter.

The network parameters for the operation of the recurrent neural network are obtained in the following manner:

obtaining network parameters when training of the recurrent neural network is completed; and performing integer approximation on fractional parameters in the network parameters when the training is completed, and taking network parameters, after the integer approximation, as the network parameters for the operation of the recurrent neural network. The approximation processing of this embodiment may also be referred to as a fixed-point operation.

When performing integer approximation on fractional parameters, the fractional parameters can be approximated as an integer parameter in accordance with a preset approximation principle. The principle of the approximate processing may be a principle in which 0.5 is rounded up and the decimal less than 0.5 is rounded down, or 0.6 is rounded up and the decimal less than 0.6 is rounded down.

In this embodiment, since fractional parameters consume more storage space than integer parameters, the integer approximation processing on fractional parameters can reduce the model size of the recurrent neural network, thereby reducing the space consumed by the client.

In another embodiment of the present application, in order to reduce the size of the client, the embodiment may further compress the client to which the above method is applied. In this embodiment, the installation file of the client can be obtained through the following steps 1b to 2b.

Step 1b: obtaining an initial installation file generated according to original codes of the client, and obtaining an operation function in the original codes of the client.

A preset installation file generation algorithm can be used to generate initial installation files. As an installation file generation tool would add extra operation functions when generating the initial installation file based on the client's original codes, the size of the client installation file is increased.

The installation file generation tool may be Visual Studio (VS). An operation function may also be referred to as an operation (op).

In this embodiment, the operation functions in the client's original codes may be saved by the programmer during code writing, or they may be operation functions in the client's original codes obtained from the written original codes by using other algorithms.

Step 2b: removing, from the initial installation file, operation functions other than the operation function in the original codes to obtain the installation file of the client.

The operation functions in the original codes are useful operation functions. Other operation functions are useless operation functions. For example, useless operation functions include tf.gather, tf.concat and the like. After removing these useless operation functions, the size of the client installation file can be reduced.

The present application is described in detail below with reference to a specific example.

Figure 2:
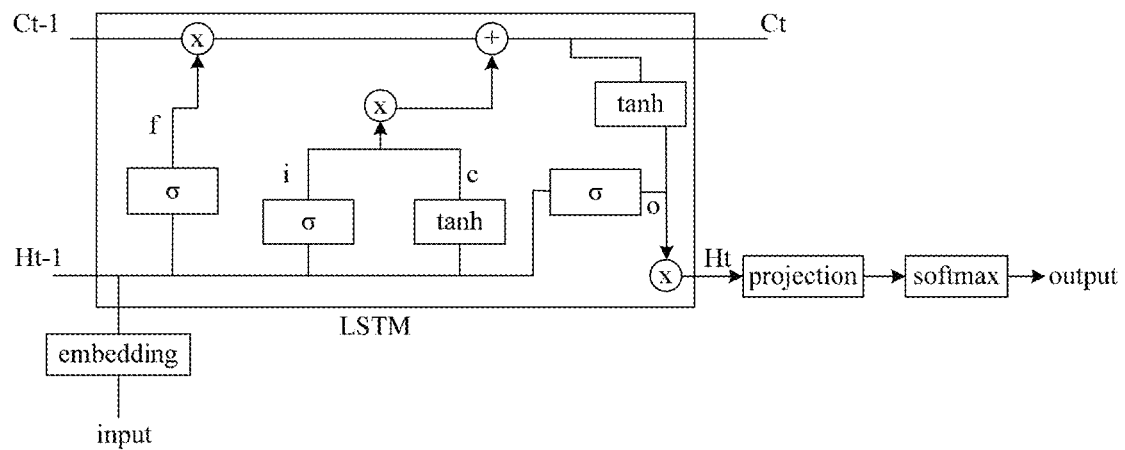
FIG. 2 is an input/output structure diagram of a recurrent neural network according to an embodiment of the present application.

Referring to FIG. 2, FIG. 2 shows an input/output structure diagram of a recurrent neural network. The recurrent neural network is LSTM. Ht−1 represents the first state parameter, input represents an input current text, and Ht represents determined state parameter of the current text. Ct−1 and Ct are the cell states of the recurrent neural network at time t−1 and time t, respectively. When the user enters a character "posted" at time t, the input layer (embedding) maps "posted" to a vector, and then uses the vector together with the state parameter Ht−1 at time t−1 as the input of the LSTM at time t. Through the input gate, forget gate, output gate and other gated units in the LSTM, the LSTM can memorize long context information and can determine what kind of information can enter the next moment through the LSTM. Therefore, LSTM can solve the problem of long dependency in context prediction. Next, the output of the hidden state of the LSTM maps, through the projection layer (projection), the state parameter Ht into a vector of the same size as the word library. Finally, the vector passes through the normalization layer (softmax) and becomes a probability distribution across a word library, that is, a score distribution. Finally, the words needed are output by sorted probabilities.

Specifically, the LSTM determines, through the forget gate gated unit, which information to pass:

$$f=\sigma(Wf \cdot [Ht'1, xt]+bf)$$

The gated unit determines, through the sigmoid function, which information to pass. For the input gate gated unit, the processing includes:

$$i=\sigma(Wi \cdot [Ht-1, xt]+bi)$$

$$c=\tanh(Wc \cdot [Ht-1, xt]+bc)$$

Through the above two formulas, required information can be added to the input gate. The gating unit of the output gate determines what kind of information output is needed:

$$o=\sigma(Wo \cdot [Ht-1, xt]+bo)$$

$$Ht=o*\tanh(c)$$

Since this embodiment finally needs the probability distribution across a word library, Ht is converted into the probability distribution across the word library through the projection layer and softmax:

$$y=Wp \cdot Ht+bp$$

$$p=\text{softmax}(y)$$

wherein, p is the word score determined for a word in the word library. softmax ( ) is a normalization function. Wf, Wi, Wc, Wo, Wp, bf, bi, bc, bo and bp are all network parameters of the LSTM during operation. "·" is a general multiplication symbol. "*" is the symbol of the Hadamard product. "xt" is the value of a vector into which the current text is converted, σ is the sigmoid function, and tan h is the hyperbolic tangent function in trigonometric functions.

The size of a recurrent neural network is generally tens of trillions or even hundreds of megabytes. The LSTM-based recurrent neural network needs about 20 to 30 ms for one inference. That is, the time to determine a predicted text is about 20 to 30 ms. The time taken by the model is unacceptable if the context input by the user is long. As to the problem of model size, the model size can be reduced by fixed-pointing and selecting only useful operations op without affecting the accuracy of the model. As to the problem of model's prediction time, with loop iteration feature of LSTM, a previous state parameter of the LSTM as saved in the cache can be used. When calculating the state parameter of the current text, the state parameter can be obtained from the cache without repeated calculations. This greatly reduces the time for model's prediction.

For example, suppose that the sentence the user wants to input is "I posted a photo on Facebook". The client performs input prediction through the method of the foregoing embodiments. Once a user's intention of text input is detected, a sentence beginning tag <S> is added by default as input text without of previous text. At this time, the output of the result of the client is:

I, I don't, I'm, if, it, it's

Figure 3:
FIG. 3 is a schematic diagram of an output result of an input method client interface according to an embodiment of the present application.

Referring to FIG. 3, which is a schematic diagram of the output interface of an input method client. The interface displays an input box, a predicted text presentation area below, and an area for a preset virtual keyboard. When the user moves the cursor to the input box, the client detects the user's intention to input a text. At this time, the output results of I, I don't, I'm, if, it, and it's can be displayed in the predicted text display area for the user to select. When the user selects "I" from the above output results, "<S> I" is taken as the input text, the following prediction result is output:

don't know, don't, love, am

The user finds no wanted word and then input a "p". "<S> I p" is taken as input text, and the following prediction result is output:

posted a, posted, promise, pray, put

The user selects the phrase "posted a". Then "<S> I posted a" is taken as input text, and the following prediction result is output:

new, new video, photo, picture

The user selects the word "photo". Then "<S> I posted a photo" is taken as input text, and the following prediction result is output:

of, of my, to, on

The user selects the word "on". Then "<S> I posted a photo on" is taken as input text, and the following prediction result is output:

my, my blog, Facebook, Instagram, the

The user selects "Facebook" and the input is complete. It can be seen that the intelligent input method based on LSTM can greatly improve the user's input efficiency.

Figure 4:
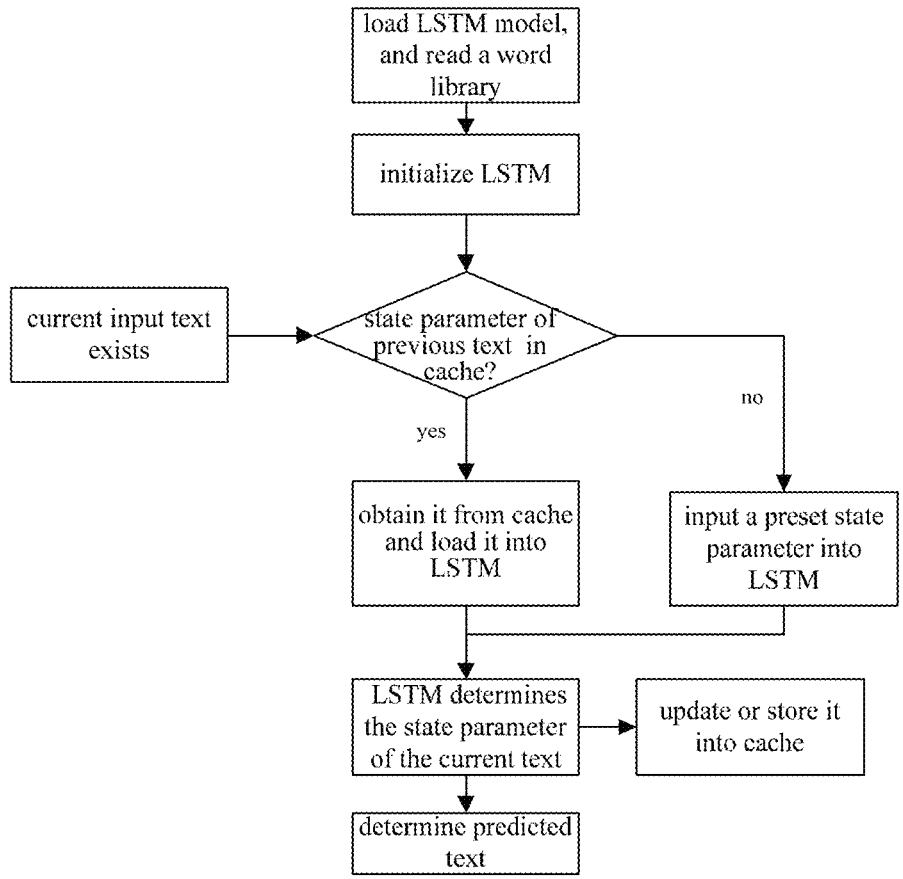
FIG. 4 is a schematic flowchart of determining a prediction result according to an embodiment of the present application.

Referring to FIG. 4, FIG. 4 is a schematic flowchart of determining a prediction result based on an LSTM. When the client is enabled, an LSTM model is first loaded and word library is read to initialize the LSTM. When the client detects an input current text (word list), it determines whether there is a state parameter of the previous text of the current text in the cache. If there is, the state parameter of the previous text is obtained from the cache, and is input together with the current text into the LSTM. The LSTM determines the state parameter of the current text according to the state parameter of the previous text, and updates the state parameter of the previous text in the cache to the state parameter of the current text. If the state parameter of the previous text of the current text does not exist in the cache, a preset state parameter and the current text are input into the LSTM. The LSTM determines the state parameter of the current text according to the preset state parameter. The state parameter of the current text is stored in the cache. After obtaining the state parameter of the current text, the client continues to determine the predicted text of the current text from the word library according to the state parameter of the current text, and uses it as the prediction result to be output.

Figure 5:
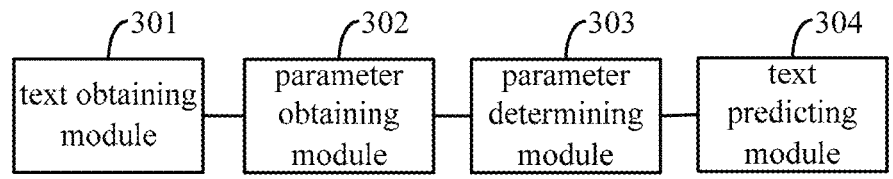
FIG. 5 is a schematic structural diagram of an apparatus for input prediction according to an embodiment of the present application.

FIG. 5 is a schematic structural diagram of an apparatus for input prediction according to an embodiment of the present application. The device is applicable to an electronic device, and specifically, to a client in the electronic device. This embodiment corresponds to the method embodiment shown in FIG. 1. The device may include a text obtaining module 301, a parameter obtaining module 302, a parameter determining module 303, and a text predicting module 304.

The text obtaining module 301 is configured for obtaining an input current text.

The parameter obtaining module 302 is configured for obtaining a first state parameter of a first text from a cache. The first text is a previous text of the current text. The first state parameter is determined through a preset recurrent neural network according to the first text and a state parameter of a previous text of the first text. The recurrent neural network is trained with a preset word library; the word library is used to store words.

The parameter determining module 303 is configured for inputting the current text and the first state parameter into the recurrent neural network, and determining a state parameter of the current text through the recurrent neural network according to the first state parameter.

The text predicting module 304 is configured for determining a predicted text of the current text from the word library according to the state parameter of the current text.

Figure 6:
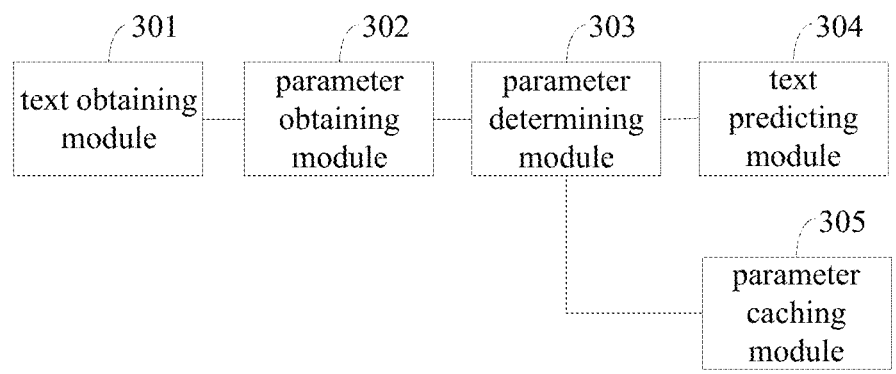
FIG. 6 is another schematic structural diagram of an apparatus for input prediction provided by an embodiment of the present application.

In another embodiment of the present application, further to the embodiment shown in FIG. 5, the apparatus further comprises, as shown in FIG. 6:

a parameter caching module 305, configured for storing the state parameter of the current text in the cache after determining the state parameter of the current text.

Figure 7:
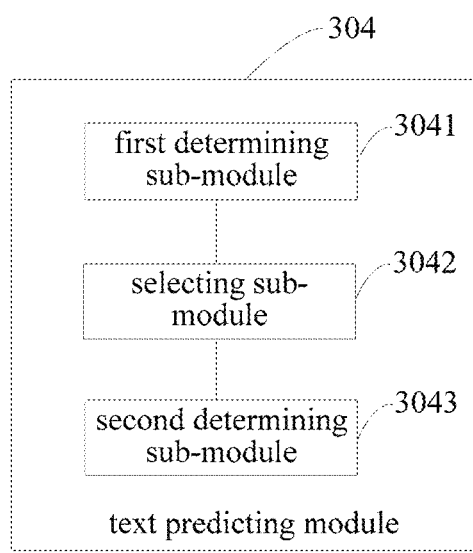
FIG. 7 is a schematic diagram of a specific structure of a text prediction module 304 in the embodiment shown in FIG. 5.

In another embodiment of the present application, further to the embodiment shown in FIG. 5, the text predicting module 304 comprises, as shown in FIG. 7:

a first determining sub-module 3041 configured for determining word scores for words in the word library according to the state parameter of the current text;

a selecting sub-module 3042 configured for selecting target words from the words in the word library according to the word scores; and a second determining sub-module 3043 configured for determining a predicted text of the current text according to the target words.

In another embodiment of the present application, further to the embodiment shown in FIG. 5, the second determining sub-module is specifically configured for:

matching the current text with morphemes in a preset dictionary library respectively, and taking morphemes in the dictionary library that match the current text as candidate morphemes that are similar to the current text, wherein, the dictionary library is used to store morphemes;

obtaining word scores for words in the word library determined in the input prediction of the first text;

determining scores for the candidate morphemes from the word scores for words in the word library determined in the input prediction of the first text; and selecting the predicted text of the current text from the target words and candidate morphemes according to word scores for the target words and the scores for the candidate morphemes.

In another embodiment of the present application, further to the embodiment shown in FIG. 5, determining a state parameter of the current text through a recurrent neural network according to the first state parameter comprises:

determining the state parameter of the current text according to network parameters for the operation of the recurrent neural network and the first state parameter;

wherein, the network parameters for the operation of the recurrent neural network are obtained in the following manner:

obtaining network parameters when training of the recurrent neural network is completed; and performing integer approximation on fractional parameters in the network parameters when the training is completed, and taking network parameters subjected to the integer approximation as the network parameters for the operation of the recurrent neural network.

In another embodiment of the present application, further to the embodiment shown in FIG. 5, the apparatus is applied to a client, and the installation file of the client is obtained by the following operations:

obtaining an initial installation file generated according to original codes of the client, and obtaining an operation function in the original codes of the client; and removing, from the initial installation file, operation functions other than the operation function in the original codes to obtain the installation file of the client.

Since the foregoing apparatus embodiment is obtained based on the method embodiment, and has the same technical effect as the method embodiment, details of which are thus not described herein again. A brief description of the apparatus embodiment is provided in view of the resemblance to the method embodiment. For details of the apparatus, reference can be made to the description of the method embodiment.

Figure 8:
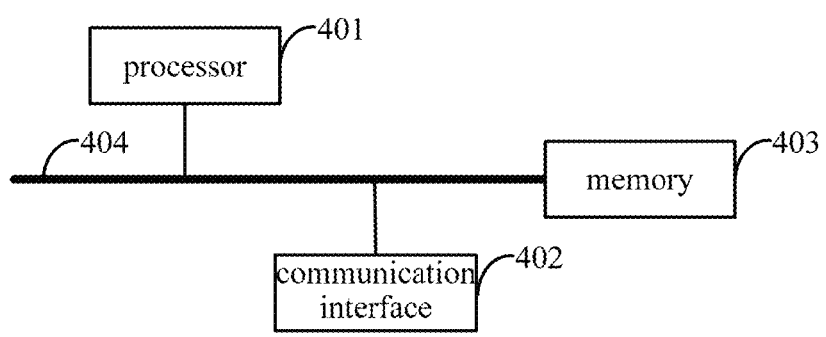
FIG. 8 is a schematic structural diagram of an electronic device according to an embodiment of the present application.

FIG. 8 is a schematic structural diagram of an electronic device according to an embodiment of the present application. The electronic device includes a processor 401, a communication interface 402, a memory 403, and a communication bus 404. The processor 401, the communication interface 402, and the memory 403 communicate with each other through the communication bus 404.

The memory 403 is configured to store a computer program.

The processor 401 is configured to perform the method provided in the embodiments of the present application when executing the computer program stored in the memory 403. The method includes:

obtaining an input current text;

obtaining a first state parameter of a first text from a cache, wherein the first text is a previous text of the current text; the first state parameter is determined through a preset recurrent neural network according to the first text and a state parameter of a previous text of the first text; the recurrent neural network is trained with a preset word library; the word library is used to store words;

inputting the current text and the first state parameter into the recurrent neural network, and determining a state parameter of the current text through the recurrent neural network according to the first state parameter; and determining a predicted text of the current text from the word library according to the state parameter of the current text.

The communication bus 404 in the electronic device may be a Peripheral Component Interconnect (PCI) bus or an Extended Industry Standard Architecture (EISA) bus. The communication bus 404 may include an address bus, a data bus, a control bus, and the like. For convenience of representation, the communication bus is denoted in the drawings by a thick line. However, this does not mean that there is only one bus or one type of bus.

The communication interface 402 is used for communication between the electronic device and other devices.

The memory 403 may include a random access memory (RAM), and may also include a non-volatile memory (NVM), such as at least one disk memory. Optionally, the memory 403 may also be at least one storage device remote to the foregoing processor.

The processor 401 may be a general-purpose processor, including a Central Processing Unit (CPU), a Network Processor (NP), and the like; it may also be a Digital Signal Processor (DSP), an Application Specific Integrated Circuit (ASIC), a Field-Programmable Gate Array (FPGA), or other programmable logic devices, discrete gate or transistor logic devices, discrete hardware components.

It can be seen that, in the embodiment of the present application, a state parameter of a first text can be obtained from the cache. The current text and a state parameter of the first text are input into a recurrent neural network. The recurrent neural network determines a state parameter of the current text according to the state parameter of the first text and determines a predicted text of the current text from a word library based on the state parameter of the current text. When determining the predicted text of the current text, the recurrent neural network does not need to determine the state parameter of the first text according to the state parameter of a previous text of the first text, but obtains the state parameter of the first text directly from the cache. Time consumed for determining the predicted text can thus be reduced and user experience is enhanced.

An embodiment of the present application further provides a computer-readable storage medium, in which a computer program is stored. When being executed by a processor, the computer program performs the method for input prediction according to the embodiments of the present application. The method may include the following operations.

An input current text is obtained.

A first state parameter of a first text is obtained from a cache. The first text is a previous text of the current text. The first state parameter is determined through a preset recurrent neural network according to the first text and a state parameter of a previous text of the first text. The recurrent neural network is trained with a preset word library. The word library is used to store words.

The current text and the first state parameter are input into the recurrent neural network. A state parameter of the current text is determined through the recurrent neural network according to the first state parameter.

A predicted text of the current text is determined from the word library according to the state parameter of the current text.

It can be seen that, in the embodiment of the present application, a state parameter of a first text can be obtained from the cache. The current text and a state parameter of the first text are input into a recurrent neural network. The recurrent neural network determines a state parameter of the current text according to the state parameter of the first text and determines a predicted text of the current text from a word library based on the state parameter of the current text. When determining the predicted text of the current text, the recurrent neural network does not need to determine the state parameter of the first text according to the state parameter of a previous text of the first text, but obtains the state parameter of the first text directly from the cache. Time consumed for determining the predicted text can thus be reduced and user experience is enhanced.

An embodiment of the present invention further provides an application program which, when executed, implements the input prediction method according to the embodiments of the present application. Specifically, the application program may perform the following operations when being executed by a processor:

obtaining an input current text;

obtaining a first state parameter of a first text from a cache, wherein the first text is a previous text of the current text; the first state parameter is determined through a preset recurrent neural network according to the first text and a state parameter of a previous text of the first text; the recurrent neural network is trained with a preset word library; the word library is used to store words;

inputting the current text and the first state parameter into the recurrent neural network, and determining a state parameter of the current text through the recurrent neural network according to the first state parameter; and determining a predicted text of the current text from the word library according to the state parameter of the current text.

It can be seen that in the embodiment of the present application, when the application program is executed by the processor, a state parameter of a first text can be obtained from the cache. The current text and a state parameter of the first text are input into a recurrent neural network. The recurrent neural network determines a state parameter of the current text according to the state parameter of the first text and determines a predicted text of the current text from a word library based on the state parameter of the current text. When determining the predicted text of the current text, the recurrent neural network does not need to determine the state parameter of the first text according to the state parameter of the previous text of the first text, but obtains the state parameter of the first text directly from the cache. Time consumed for determining the predicted text can thus be reduced and user experience is enhanced.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

Each embodiment in this specification is described in a related manner, and the same or similar parts between the various embodiments can be referred to each other. Each embodiment focuses on the differences from other embodiments. In particular, as for embodiments of a device, electronic apparatus, storage medium and application, since they are basically similar to the method embodiment, the description is relatively simple, and the relevant part may refer to the description of the method embodiment.

The above descriptions are merely preferred embodiments of the present application, and are not intended to limit the protection scope of the present application. Any modification, equivalent replacement, and improvement made within the spirit and principle of this application fall within the protection scope of this application.

What is claimed is:

1. A method for input prediction, comprising:

obtaining an input current text;

obtaining a first state parameter of a first text from a cache, wherein the first text is a previous text of the current text; the first state parameter is determined through a preset recurrent neural network according to the first text and a state parameter of a previous text of the first text; the recurrent neural network is trained with a word library, wherein the word library is preset; the word library is used to store words, wherein a state parameter of a text can reflect association between the text and words in the word library;

inputting the current text and the first state parameter into the recurrent neural network, and determining a state parameter of the current text through the recurrent neural network according to the first state parameter; and determining a predicted text of the current text from the word library according to the state parameter of the current text.

2. The method according to claim 1, wherein, after determining the state parameter of the current text, the method further comprises:

storing the state parameter of the current text in the cache.

3. The method according to claim 1, wherein, determining a predicted text of the current text from the word library according to the state parameter of the current text comprises:

determining word scores for words in the word library according to the state parameter of the current text;

selecting target words from the words in the word library according to the word scores; and determining a predicted text of the current text according to the target words.

4. The method according to claim 3, wherein, determining a predicted text of the current text according to the target words comprises:

matching the current text with morphemes in a preset dictionary library respectively, and taking morphemes in the dictionary library that match the current text as candidate morphemes that are similar to the current text, wherein, the dictionary library is used to store morphemes;

obtaining word scores for words in the word library determined in the input prediction of the first text;

determining scores for the candidate morphemes from the word scores for words in the word library determined in the input prediction of the first text; and selecting the predicted text of the current text from the target words and candidate morphemes according to word scores for the target words and the scores for the candidate morphemes.

5. The method according to claim 1, wherein, determining the state parameter of the current text through a recurrent neural network according to the first state parameter comprises:

determining the state parameter of the current text according to network parameters for the operation of the recurrent neural network and the first state parameter;

wherein, the network parameters for the operation of the recurrent neural network are obtained in the following manner:

obtaining network parameters when training of the recurrent neural network is completed; and performing integer approximation on fractional parameters in the network parameters when the training is completed, and taking network parameters subjected to the integer approximation as the network parameters for the operation of the recurrent neural network.

6. The method according to claim 1, wherein, the method is applied to a client, and an installation file of the client is obtained by the following operations:

obtaining an initial installation file generated according to original codes of the client, and obtaining an operation function in the original codes of the client; and removing, from the initial installation file, operation functions other than the operation function in the original codes to obtain the installation file of the client.

7. An electronic device comprising a processor, a communication interface, a memory, and a communication bus, wherein the processor, the communication interface, and the memory communicate with each other through the communication bus;

the memory is configured for storing a computer program; and the processor is configured for executing the computer program stored in the memory to perform the input prediction method according to claim 1.

8. A non-transitory computer-readable storage medium having a computer program stored thereon which, when executed by a processor, performs the input prediction method according to claim 1.

9. An apparatus for input prediction, comprising a memory that stores executable modules; and a processor, coupled to the memory, that executes the executable modules, the executable modules comprising:

a text obtaining module configured for obtaining an input current text;

a parameter obtaining module configured for obtaining a first state parameter of a first text from a cache, wherein the first text is a previous text of the current text; the first state parameter is determined through a preset recurrent neural network according to the first text and a state parameter of a previous text of the first text; the recurrent neural network is trained with a word library, wherein the word library is preset; the word library is used to store words, wherein a state parameter of a text can reflect association between the text and words in the word library;

a parameter determining module configured for inputting the current text and the first state parameter into the recurrent neural network, and determining a state parameter of the current text through the recurrent neural network according to the first state parameter; and a text predicting module configured for determining a predicted text of the current text from the word library according to the state parameter of the current text.

10. The apparatus according to claim 9, further comprising:

a parameter caching module, configured for storing the state parameter of the current text in the cache after determining the state parameter of the current text.

11. The apparatus according to claim 9, wherein, the text predicting module comprises:

a first determining sub-module configured for determining word scores for words in the word library according to the state parameter of the current text;

a selecting sub-module configured for selecting target words from the words in the word library according to the word scores; and a second determining sub-module, configured for determining a predicted text of the current text according to the target words.

12. The apparatus according to claim 11, wherein, the second determining sub-module is further configured for:

matching the current text with morphemes in a preset dictionary library respectively, and taking morphemes in the dictionary library that match the current text as candidate morphemes that are similar to the current text, wherein, the dictionary library is used to store morphemes;

obtaining word scores for words in the word library determined in the input prediction of the first text;

determining scores for the candidate morphemes from the word scores for words in the word library determined in the input prediction of the first text; and selecting the predicted text of the current text from the target words and candidate morphemes according to word scores for the target words and the scores for the candidate morphemes.

13. The apparatus according to claim 9, wherein, determining the state parameter of the current text through a recurrent neural network according to the first state parameter comprises:
   determining the state parameter of the current text according to network parameters for an operation of the recurrent neural network and the first state parameter;
   wherein, the network parameters for the operation of the recurrent neural network are obtained in the following manner:
   obtaining network parameters when training of the recurrent neural network is completed; and
   performing integer approximation on fractional parameters in the network parameters when the training is completed, and taking network parameters subjected to the integer approximation as the network parameters for the operation of the recurrent neural network.

14. The apparatus according to claim 9, wherein, the apparatus is applied to a client, and an installation file of the client is obtained by the following operations:
   obtaining an initial installation file generated according to original codes of the client, and obtaining an operation function in the original codes of the client; and
   removing, from the initial installation file, operation functions other than the operation function in the original codes to obtain the installation file of the client.

* * * * *